United States Patent
Jiang et al.

(10) Patent No.: US 11,702,354 B2
(45) Date of Patent: Jul. 18, 2023

(54) BACTERIUM-ALGA COUPLED SEWAGE TREATMENT DEVICE BASED ON ENERGY RECYCLING AND USE METHOD THEREOF

(71) Applicant: BEIJING DRAINAGE GROUP CO., LTD, Beijing (CN)

(72) Inventors: Yong Jiang, Beijing (CN); Kuixiao Li, Beijing (CN); Wei Wang, Beijing (CN); Yu Bai, Beijing (CN); Jiawei Wang, Beijing (CN); Ye Li, Beijing (CN); Kerning Wang, Beijing (CN); Lijun Zhao, Beijing (CN)

(73) Assignee: BEIJING DRAINAGE GROUP CO., LTD, Beijing (CN)

( * ) Notice: Subject to any disclaimer, the term of this patent is extended or adjusted under 35 U.S.C. 154(b) by 171 days.

(21) Appl. No.: 17/271,705

(22) PCT Filed: Mar. 31, 2020

(86) PCT No.: PCT/CN2020/082407
§ 371 (c)(1),
(2) Date: Feb. 26, 2021

(87) PCT Pub. No.: WO2021/077679
PCT Pub. Date: Apr. 29, 2021

(65) Prior Publication Data
US 2021/0403356 A1 Dec. 30, 2021

(30) Foreign Application Priority Data

Oct. 25, 2019 (CN) .......................... 201911021616.6

(51) Int. Cl.
*C02F 9/00* (2023.01)
*C02F 1/20* (2023.01)
(Continued)

(52) U.S. Cl.
CPC .................. *C02F 9/00* (2013.01); *C02F 1/20* (2013.01); *C02F 1/444* (2013.01); *C02F 3/308* (2013.01);
(Continued)

(58) Field of Classification Search
CPC ...... C02F 3/32; C02F 9/00; C02F 1/52; C02F 2209/14; C02F 2209/18; C02F 2209/38; C02F 3/02; C02F 3/322; C02F 3/325
(Continued)

(56) References Cited

U.S. PATENT DOCUMENTS

2010/0276361 A1* 11/2010 Limcaco ................. C12P 5/023
210/603

FOREIGN PATENT DOCUMENTS

CN        1837091 A       9/2006
CN      102336498 A   *   2/2012
(Continued)

*Primary Examiner* — Claire A Norris
(74) *Attorney, Agent, or Firm* — Browdy and Neimark, PLLC

(57) ABSTRACT

The present disclosure relates to a bacterium-alga coupled sewage treatment device based on energy recycling and a use method thereof. The device comprises a pretreatment device, a photobioreactor, an alga separation apparatus, a continuous flow bioreactor and a secondary sedimentation tank which are sequentially connected in order, the pretreatment device being connected to a municipal sewage inlet pipe, the photobioreactor being connected to a carbon dioxide gas charging device through a gas filling pipeline, one part of a sludge thickening tank being connected to the secondary sedimentation tank, the other part thereof being connected to remaining sludge of the pretreatment device, carbon dioxide generated from the sludge which flows through the thickening tank and is thermally-hydrolyzed and anaerobically-acidified being connected to the photobioreactor through a gas inlet pipeline, and the alga separation
(Continued)

apparatus being further connected to a filter press. The present disclosure has the advantages of a rational structural design, reliable and stable operation, a low operation and maintenance cost and high automaticity and intelligence, and being suitable for the use and transformation requirements of a wide range of sewage treatment plants, etc.

7 Claims, 3 Drawing Sheets

(51) Int. Cl.
| | | |
|---|---|---|
| *C02F 1/44* | (2023.01) | |
| *C02F 3/30* | (2023.01) | |
| *C02F 3/32* | (2023.01) | |
| *C02F 1/00* | (2023.01) | |
| *C02F 101/10* | (2006.01) | |
| *C02F 101/16* | (2006.01) | |

(52) U.S. Cl.
CPC .............. *C02F 3/322* (2013.01); *C02F 1/004* (2013.01); *C02F 2001/007* (2013.01); *C02F 2101/105* (2013.01); *C02F 2101/163* (2013.01); *C02F 2209/14* (2013.01); *C02F 2209/15* (2013.01); *C02F 2209/16* (2013.01); *C02F 2209/22* (2013.01); *C02F 2301/10* (2013.01); *C02F 2303/10* (2013.01)

(58) Field of Classification Search
USPC .................................................. 210/602, 603
See application file for complete search history.

(56) References Cited

FOREIGN PATENT DOCUMENTS

| CN | 102336498 A | | 2/2012 |
|---|---|---|---|
| CN | 103981089 A | | 8/2014 |
| CN | 105621783 A | * | 6/2016 |

* cited by examiner

| Effects in the day time | | | | | | |
|---|---|---|---|---|---|---|
| Sampling points | Raw water | Coagulated effluent | Gas flotation effluent of microalgae | Anoxic effluent | Aerobic effluent | Secondary sedimentation effluent |
| BOD | 213.81 | 213.81 | 213.81 | 4.00 | 2.80 | 2.80 |
| NH3 | 35.44 | 35.44 | 23.94 | 2.65 | 0.10 | 0.10 |
| NO3 | 0.20 | 0.20 | 0.18 | 0.10 | 6.93 | 6.93 |
| TN | 48.98 | 48.98 | 24.12 | 2.75 | 7.03 | 7.03 |
| TP | 5.02 | 5.02 | 0.10 | 0.03 | 0.106 | 0.102 |
| SS | 241.08 | <2 | <2 | <2 | <2 | <2 |
| O2 | 0.00 | 0.00 | 225.82 | 0.10 | 1.00 | 1.00 |
| Effects at night | | | | | | |
| Sampling points | inf | Coagulated effluent | Gas flotation effluent of microalgae | Anoxic effluent | Aerobic effluent | Secondary sedimentation effluent |
| BOD | 217.21 | 203.77 | 188.07 | 4.10 | 2.80 | 2.80 |
| NH3 | 35.44 | 33.81 | 9.13 | 1.97 | 0.10 | 0.10 |
| NO3 | 0.20 | 0.20 | 0.18 | 0.10 | 2.70 | 2.70 |
| TN | 42.51 | 42.29 | 9.31 | 1.17 | 2.80 | 2.80 |
| TP | 4.71 | 4.25 | 1.36 | 1.24 | 0.10 | 0.10 |
| SS | 241.08 | 2.00 | 2.00 | 2.00 | 2.00 | 2.00 |
| O2 | 0.00 | 0.00 | 1.36 | 0.10 | 1.00 | 1.00 |

Fig. 3

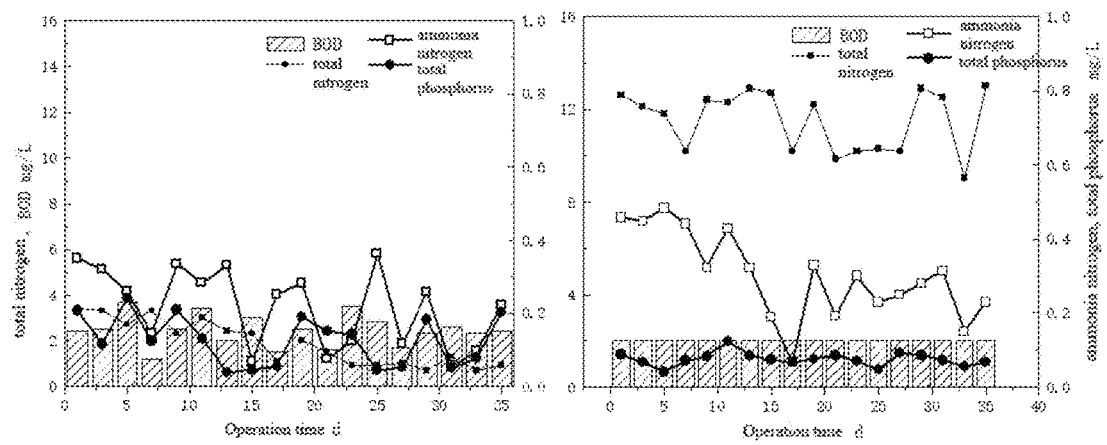

Fig. 4

BACTERIUM-ALGA COUPLED SEWAGE TREATMENT DEVICE BASED ON ENERGY RECYCLING AND USE METHOD THEREOF

FIELD OF TECHNOLOGY

The present disclosure relates to the technical field of sewage treatment, and in particular to a bacterium-alga coupled sewage treatment device based on energy recycling and a use method thereof.

BACKGROUND

At present, effluent of secondary sedimentation tanks of domestic agricultural sewage treatment plants contains high-concentration inorganic nitrogen and phosphorus, which causes eutrophication of downstream water and damage to an ecological system if it is drained without advanced treatment. If nutrient elements exceed the self-purification capacity of receiving water, negative effects such as outbreak of algal blooms, a low concentration of dissolved oxygen, death of fish, a change of a pH, and generation of an algal poison will be brought about.

However, at present, most sewage treatment plants use secondary treatment and tertiary treatment of an activated sludge method in which a large number of carbon source agents and phosphorous removal agents are added in a nitrogen and phosphorus removal process, which causes a high cost of chemical agents. Meanwhile, in a treatment process, nitrogen and phosphorus resources are converted into nitrogen gas and remaining sludge containing phosphorus is drained from the water instead of being recycled. Remaining sludge treatment also causes a high treatment cost, and a sludge treatment cost accounts for up to 30-60% of an operation cost of a recycled water plant.

Cells in microalgae carry out photosynthesis under the lighting condition, to capture, absorb and utilize various nitrogen sources, phosphorus sources and inorganic carbon sources in sewage for anabolism, so as to synthesize substances such as protein and grease inside the cells of the microalgae. Compared with the activated sludge method, a microalgae photobioreactor method for water treatment can achieve the objective of removing nutrient elements of nitrogen and phosphorus with lower energy consumption and increased ecological safety, and meanwhile the nitrogen and the phosphorus can be recycled as raw materials for preparing a biofuel.

SUMMARY

The present disclosure aims to provide an bacterium-alga coupled sewage treatment device based on energy recycling and a use method thereof, which have the advantages of a reasonable structural design, reliable and stable operation, a low operation and maintenance cost and high automation and intelligence, and being suitable for the use requirements of a wide range of sewage treatment plants, etc.

In order to achieve the above-mentioned objective, the present disclosure is implemented by the following technical solution:

a bacterium-alga coupled sewage treatment device based on energy recycling, comprising a pretreatment device, a photobioreactor, an alga separation apparatus, a continuous flow bioreactor and a secondary sedimentation tank which are sequentially connected in order, the pretreatment device being connected to a municipal sewage inlet pipe, the photobioreactor being connected to a carbon dioxide gas charging device through a gas filling pipeline, one part of a sludge thickening tank being connected to the secondary sedimentation tank, the other part thereof being connected to remaining sludge of the pretreatment device, carbon dioxide generated from the sludge which flows through the thickening tank and is thermally-hydrolyzed and anaerobically-acidified being connected to the photobioreactor through a gas inlet pipeline, and the alga separation apparatus being further connected to a filter press.

As further optimization of the above-mentioned solution, a concentration of suspended matter of effluent of the pretreatment device is required to be 0-2 mg/L, and the pretreatment device can be one form of a grating, an ultrafiltration membrane, a flocculation sedimentation tank and a sand filter or any combination thereof.

As further optimization of the above-mentioned solution, the photobioreactor is a flat-plate type photobioreactor, an up-flow type photobioreactor, a pipeline type photobioreactor or a closed type annular shallow tank, a range of a hydraulic retention time of the photobioreactor being 4-6 d, an algal density being controlled to $8\text{-}10\times10^6$/mL, and an indoor temperature being controlled to 20-32° C.; and by using natural lighting, the effluent quality is controlled within the following ranges: ammonia nitrogen: 15-20 mg/L, nitrate nitrogen: 1-2 mg/L, total nitrogen: 16-22 mg/L, total phosphorus: less than 0.1 mg/L, and dissolved oxygen: 100-160 mg/L, so as to guarantee subsequent normal operation of the continuous flow bioreactor.

As further optimization of the above-mentioned solution, microalgae in the photobioreactor is spirulina, scenedesmus or nannochloropsis.

As further optimization of the above-mentioned solution, the photobioreactor includes an automatic control system and the carbon dioxide gas charging device, the automatic control system including a PLC control system and carbon dioxide online monitor assemblies, the gas filling pipeline of the carbon dioxide gas charging device being provided with a valve, and the carbon dioxide online monitor assemblies being arranged in a bacterium liquid of the photobioreactor, on the gas filling pipeline and in an anaerobic acidification reaction process respectively and configured to detect concentrations of carbon dioxide in real time online and transmit the concentrations of the carbon dioxide detected in real time to the PLC controller; and after performing data conversion on the received real-time concentrations of the carbon dioxide, the PLC controller compares the same with a preset corresponding carbon dioxide threshold value, controls opening of the valve according to a comparison result and controls a concentration of carbon dioxide in the photobioreactor to 3-4 mg/L.

As further optimization of the above-mentioned solution, a deaerator is any one of a vacuum deaerator, a supergravity deaerator, a spiral membrane type deaerator and a gas-stripping deaerator, a range of dissolved oxygen of effluent of the deaerator being required to be 0-0.3 mg/L.

As further optimization of the above-mentioned solution, the continuous flow bioreactor is divided into an anoxic zone and an aerobic zone, a volume ratio of the anoxic zone to the aerobic zone being 1:3-1:4, and the alga separation apparatus being connected to the continuous flow bioreactor in the following mode:

separating a concentrated algal liquid and supernatant in the alga separation apparatus; making the concentrated algal liquid into an algal biscuit through filter-press operation of the filter press; the supernatant entering the continuous flow bioreactor is divided into two parts, wherein one part of the supernatant enters the anoxic zone of the continuous flow bioreactor after deoxygenated by the deaerator, denitrification bacteria utilize organic matter to perform denitrification, so as to remove nitrate nitrogen in reflux sludge and a nitrification liquid, the other part of the supernatant enters the aerobic zone of the continuous flow bioreactor, and heterotrophic bacteria and nitrification bacteria utilize part of oxygen provided by oxygen-rich supernatant to oxidize the organic matter and nitrify ammonia nitrogen;

The influent of the continuous flow bioreactor is pumped by influent pumps into the anoxic zone and the aerobic zone, respectively, with a distribution ratio ranging from 20%:80% to 30%:70%. A smaller ratio of the influent enters the anoxic zone and is denitrified in the anoxic zone to remove a nitrate nitrogen reaction after mixed with reflux sludge in a deoxygenation zone and the secondary sedimentation tank. Plug flow stirrers configured to guarantee that sludge and water are sufficiently mixed and flow backwards are arranged in the anoxic zone and the aerobic zone, respectively. A larger ratio of influent is subjected to an aerobic reaction in the aerobic zone after mixed with effluent of the anoxic zone, so as to remove remaining organic matter and ammonia nitrogen; arranging the deoxygenation zone at a tail end of the aerobic zone, wherein a retention time in the deoxygenation zone is 0.5-11 h, and the deoxygenation zone is implemented by closing a valve of an aerator pipe at the tail end of the aerobic zone; arranging a nitrification liquid reflux pump in the deoxygenation zone, and making part of a nitrate nitrogen mixed liquid in a deoxygenation section reflux to a front end of the anoxic zone, wherein a range of a reflux ratio is 150%-300%; and arranging a sludge reflux pump at the bottom of the secondary sedimentation tank, and making precipitated sludge reflux to the anoxic zone, wherein a reflux ratio is 80%-100% of the total flow of the supernatant, and a range of a retention time in the continuous flow bioreactor is 8 h-10 h.

As further optimization of the above-mentioned solution, the aerobic zone of the continuous flow bioreactor is provided with an aeration system and an accurate aeration monitoring control system, the aeration system including air spargers, blowers, valves and flow meters, the air spargers being arranged at the tank bottom of the aerobic zone, the blowers being connected to the air spargers through air pipes, the valves and the flow meters being arranged on the air pipes respectively, the accurate aeration monitoring control system including dissolved oxygen meters, an ammonia-nitrogen meter and an accurate control system, one dissolved oxygen meter being arranged in the supernatant of the alga separation apparatus, one dissolved oxygen meter being arranged in the aerobic zone, the ammonia nitrogen meter being arranged at the tail end of the aerobic zone, the accurate control system being in date signal connection with the dissolved oxygen meters and the ammonia nitrogen meter respectively; the accurate control system being in control connection with the valves, and the accurate aeration monitoring control system automatically controlling opening of the blowers and opening of the valves according to acquired changing signals of concentrations of dissolved oxygen and ammonia nitrogen and maintaining dissolved oxygen in the aerobic zone at 1-2 mg/L and a concentration of ammonia nitrogen at a tail end of an aeration tank less than 0.1 mg/L.

A use method of the bacterium-alga coupled sewage treatment device based on energy recycling of the present disclosure includes the following steps:

1) making municipal sewage with suspended matter and toxic matter removed by the pretreatment device enter the photobioreactor, adding a small amount of carbon dioxide and sludge anaerobic acidificated carbon dioxide and refluxing, and using microalgae in the photobioreactor to remove phosphorus and ammonia nitrogen;

2) separating, in the alga separation apparatus, a concentrated algal liquid and supernatant from an alga-containing mixed liquid treated by the photobioreactor in step 1), making the concentrated algal liquid into an algal biscuit through filter-press operation of the filter press and making the supernatant enter step 3);

3) making the supernatant in step 2) enter the continuous flow bioreactor in two parts, wherein one part of the supernatant enters the anoxic zone of the continuous flow bioreactor after deoxygenated by the deaerator, denitrification bacteria utilize organic matter to perform denitrification, so as to remove nitrate nitrogen in reflux sludge and a nitrification liquid, the other part of the supernatant enters the aerobic zone, and heterotrophic bacteria and nitrification bacteria utilize part of oxygen provided by oxygen-rich supernatant to oxidize the organic matter and nitrify ammonia nitrogen;

4) making a sludge-water mixture treated in the aerobic zone of the continuous flow bioreactor in step 3) flow through the secondary sedimentation tank to undergo sludge-water separation, such that the supernatant becomes recycled water reaching a standard, and remaining sludge and remaining sludge generated through pretreatment are thickened in a sludge treatment process after being converged; and 5) performing thermal-hydrolysis and anaerobic acidification reactions on thickened sludge obtained through thickening treatment in step 4), and purifying generated carbon dioxide and adding same into the photobioreactor for recycling, wherein acidified sludge may be further processed into a carbon source product or treated into a biogas product.

The beneficial effects using the energy-recycled device coupling the bacteria with the algae for the sewage treatment and the use method thereof according to the present disclosure are as follows:

(1) the characteristic that effluent of the photobioreactor has plenty of dissolved oxygen is sufficiently utilized to provide high-quality dissolved oxygen for the aerobic zone of the continuous flow bioreactor, thereby greatly reducing aeration energy consumption;

(2) a carbon dioxide product generated by anaerobically-acidifying the remaining, sludge is sufficiently utilized to supplement the photobioreactor with an inorganic carbon source;

(3) the photobioreactor removes the nitrogen and the phosphorous with low energy consumption, the continuous flow bioreactor removes the organic matter and part of the nitrate nitrogen, and the two reactors are combined to exert respective advantages to recycle nitrogen, phosphorous and carbon resources while efficiently purifying the sewage;

(4) the accurate aeration monitoring control system and an accurate carbon dioxide monitoring control system intelligently control addition of exogenous oxygen and carbon dioxide, thereby accurately saving on energy consumption.

BRIEF DESCRIPTION OF THE DRAWINGS

FIG. 3 is a table showing on-way water quality changes of the bacterium-alga coupled sewage treatment device based on energy recycling of the present disclosure;

FIG. 4 is an effect comparison diagram of effluent qualities between a treatment method of the present disclosure and a traditional activated sludge treatment method in operation;

DESCRIPTION OF THE EMBODIMENTS

Figure 1:
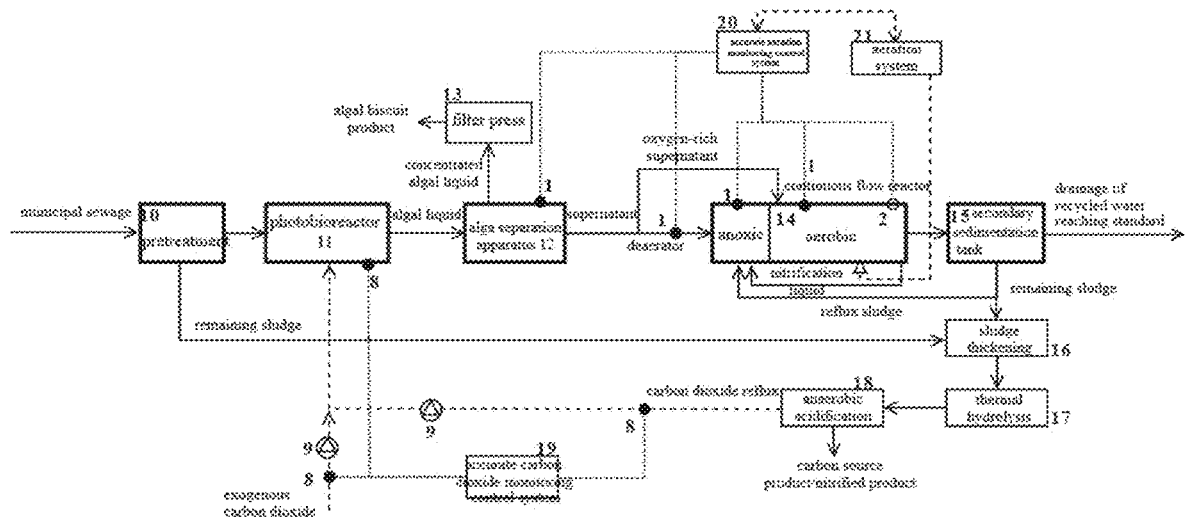
FIG. 1 is a schematic diagram of a treatment process of a bacterium-alga coupled sewage treatment device based on energy recycling of the present disclosure.
Figure 2:
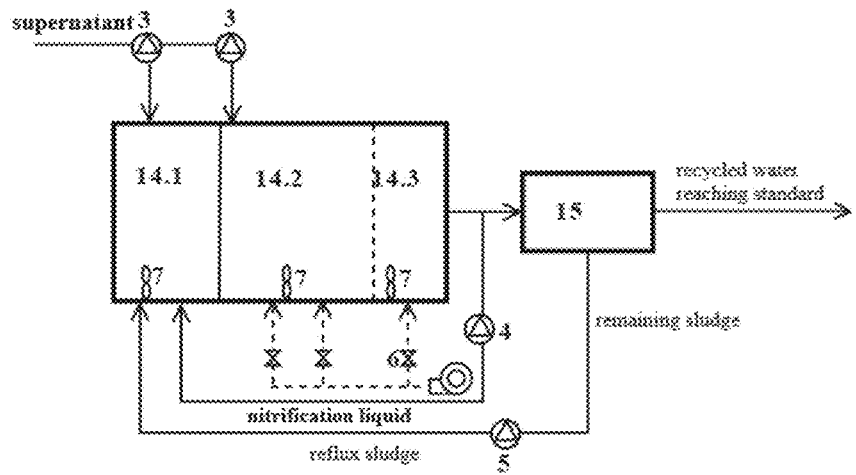
FIG. 2 is a structural diagram of a continuous flow bioreactor of the bacterium-alga coupled sewage treatment device based on energy recycling of the present disclosure.
Figure 5:
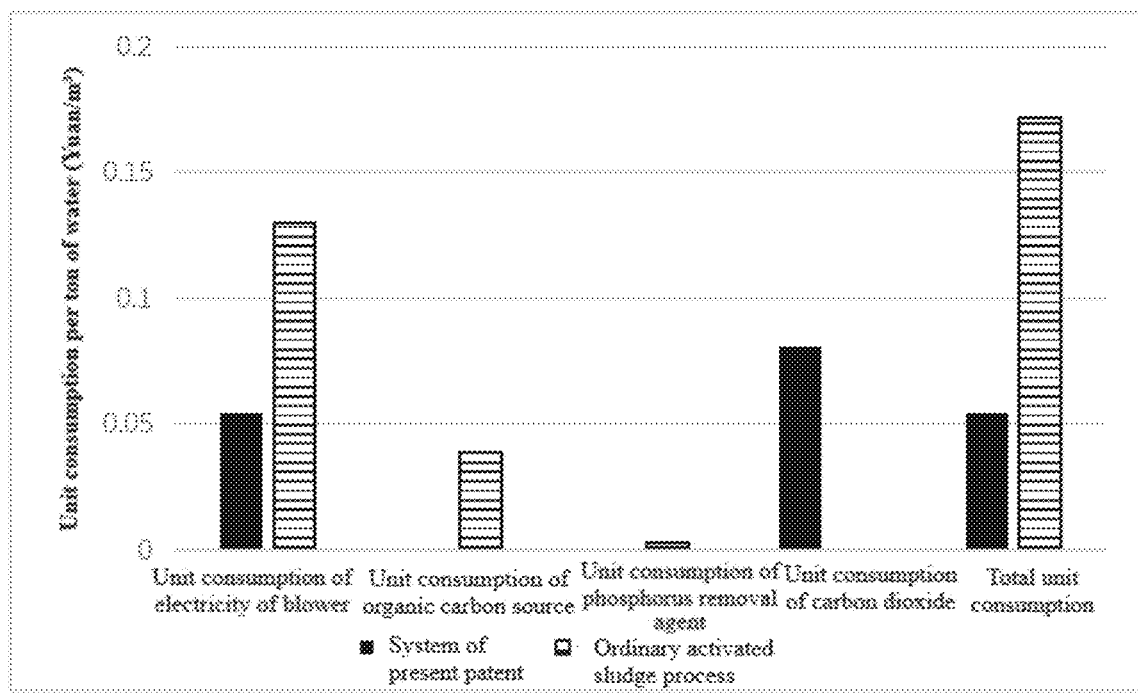
FIG. 5 is a comparison diagram of energy consumption between the treatment method of the present disclosure and the traditional activated sludge treatment method.

A bacterium-alga coupled sewage treatment device based on energy recycling and a use method thereof of the present disclosure are described in detail below in conjunction with the accompanying drawings 1-5.

The bacterium-alga coupled sewage treatment device based on energy recycling includes a pretreatment device 10, a photobioreactor 11, an alga separation apparatus 12, a continuous flow bioreactor 14 and a secondary sedimentation tank 15 which are sequentially connected in order, the pretreatment device being connected to a municipal sewage inlet pipe, the photobioreactor being connected to a carbon dioxide gas charging device through a gas filling pipeline, one part of a sludge thickening tank being connected to the secondary sedimentation tank, the other part of the sludge thickening tank being connected to remaining sludge of the pretreatment device; carbon dioxide generated from the sludge which flows through the thickening tank and is thermally-hydrolyzed 17 and anaerobically-acidified 18 being connected to the photobioreactor through a gas inlet pipeline, and the alga separation apparatus being further connected to a filter press 13.

A concentration of suspended matter of effluent of the pretreatment device is required to be 0-2 mg/L, and the pretreatment device is one form of a grating, an ultrafiltration membrane, a flocculation sedimentation tank and a sand filter or any combination thereof.

The photobioreactor is a flat-plate type photobioreactor, an up-flow type photobioreactor, a pipeline type photobioreactor or a closed type annular shallow tank, a range of a hydraulic retention time of the photobioreactor being 4-6 d, an algal density being controlled to $8-10 \times 10^6$/mL, and an indoor temperature being controlled to 20-32° C.; and by using natural lighting, an effluent quality is controlled within the following ranges: ammonia nitrogen: 15-20 mg/L, nitrate nitrogen: 1-2 mg/L, total nitrogen: 16-22 mg/L, total phosphorus: less than 0.1 mg/L, and dissolved oxygen: 100-160 mg/L, so as to guarantee subsequent normal operation of the continuous flow bioreactor.

Microalgae in the photobioreactor are spirulina, scenedesmus or nannochloropsis.

The photobioreactor includes an automatic control system 19 and the carbon dioxide gas charging device, the automatic control system including a PLC control system and carbon dioxide online monitor assemblies, the gas filling pipeline of the carbon dioxide gas charging device being provided with a valve 9, and the carbon dioxide online monitor assemblies being arranged in a bacterium liquid of the photobioreactor, on the gas filling pipeline and in an anaerobic acidification reaction process respectively and configured to detect concentrations of carbon dioxide in real time online and transmit the concentrations of the carbon dioxide detected in real time to a PLC controller; and after performing data conversion on the received real-time concentrations of the carbon dioxide, the PLC controller compares the same with a preset corresponding carbon dioxide threshold value, controls opening of the valve according to a comparison result and controls a concentration of carbon dioxide in the photobioreactor to 3-4 mg/L.

A deaerator is any one of a vacuum deaerator, a super-gravity deaerator, a spiral membrane type deaerator and a gas-stripping deaerator, a range of dissolved oxygen of effluent of the deaerator being required to be 0-0.3 mg/L.

The continuous flow bioreactor is divided into an anoxic zone 14.1 and an aerobic zone 14.2, a volume ratio of the anoxic zone to the aerobic zone being 1:3-1:4.

The alga separation apparatus being connected to the continuous flow bioreactor in the following mode:

separating a concentrated algal liquid and supernatant in the alga separation apparatus; making the concentrated algal liquid into an algal biscuit through filter-press operation of the filter press; the supernatant entering the continuous flow bioreactor is divided into two parts, wherein one part of the supernatant enters the anoxic zone of the continuous flow bioreactor after deoxygenated by the deaerator 14.3, denitrification bacteria utilize organic matter to perform denitrification, so as to remove nitrate nitrogen in reflux sludge and a nitrification liquid, the oilier part of the supernatant enters the aerobic zone of the continuous flow bioreactor, and heterotrophic bacteria and nitrification bacteria utilize part of oxygen provided by oxygen-rich supernatant to oxidize the organic matter and nitrify ammonia nitrogen;

the influent of the continuous flow bioreactor is pumped by influent pumps 3 into the anoxic zone and the aerobic zone, respectively, with a distribution ratio ranging from 20%:80% to 30%:70%, a smaller ratio of influent enters the anoxic zone and is denitrified in the anoxic zone to remove a nitrate nitrogen reaction after mixed with reflux sludge in a deoxygenation zone and the secondary sedimentation tank, plug flow stirrers 7 configured to guarantee that sludge and water are sufficiently mixed and flow backwards are arranged in the anoxic zone and the aerobic zone, respectively, a larger ratio of influent is subjected to an aerobic reaction in the aerobic zone after mixed with effluent of the anoxic zone, so as to remove remaining organic matter and ammonia nitrogen; arranging the deoxygenation zone at a tail end of the aerobic zone, wherein a retention time in the deoxygenation zone is 0.5-1 h, and the deoxygenation zone is implemented by closing a valve 6 of an aerator pipe at the tail end of the aerobic zone; arranging a nitrification liquid reflux pump 4 in the deoxygenation zone, and making part of a nitrate nitrogen mixed liquid of a deoxygenation section reflux to a front end of the anoxic zone, wherein a range of a reflux ratio is 150%-300%; and arranging a sludge reflux pump 5 at the bottom of the secondary sedimentation tank, and making precipitated sludge reflux to the anoxic zone, wherein a reflux ratio is 80%-100% of the total flow of the supernatant, and a range of a retention time in the continuous flow bioreactor is 8 h-10 h.

The aerobic zone of the continuous flow bioreactor is provided with an aeration system 21 and an accurate aeration monitoring control system 22, the aeration system including air spargers, blowers, valves and flow meters, the air spargers being arranged at the tank bottom of the aerobic zone, the blowers being connected to the air spargers through air pipes, the valves and the flow meters being arranged on the gas pipes, respectively, the accurate aeration monitoring control system including dissolved oxygen meters 1, an ammonia nitrogen meter 2 and an accurate control system, one dissolved oxygen meter 1 being arranged in the supernatant of the alga separation apparatus, one dissolved oxygen meter 1 being arranged in the aerobic zone, the ammonia nitrogen meter 2 being arranged at the tail end of the aerobic zone, the accurate control system being in data signal connection with the dissolved oxygen meter and the ammonia nitrogen meter respectively; the accurate control system being in control connection with the valves, and the accurate aeration monitoring control system automatically controlling opening of the blowers and opening of the valves 6 according to acquired changing signals of concentrations of dissolved oxygen and ammonia nitrogen and maintaining dissolved oxygen in the aerobic zone at 1-2 mg/L and a concentration of ammonia nitrogen at a tail end of an aeration tank less than 0.1 mg/L.

A use method for the above-mentioned energy-recycled device coupling the bacteria with the algae for the sewage treatment of the present disclosure includes the following steps:

1) making municipal sewage with suspended matter and toxic matter removed by the pretreatment device enter the photobioreactor, adding a small amount of carbon dioxide and sludge anaerobic acidificated carbon dioxide and refluxing, and using microalgae in the photobioreactor to remove phosphorus and ammonia nitrogen;

2) separating, in the alga separation apparatus, a concentrated algal liquid and supernatant from an alga-containing mixed liquid treated by the photobioreactor in step 1), making the concentrated algal liquid into an algal biscuit through filter-press operation of the filter press and making the supernatant enter step 3);

3) making the supernatant in step 2) enter the continuous flow bioreactor in two parts, wherein one part of the supernatant enters the anoxic zone of the continuous flow bioreactor after deoxygenated by the deaerator, denitrification bacteria utilize organic matter to perform denitrification, so as to remove nitrate nitrogen in reflux sludge and a nitrification liquid, the other part of the supernatant enters the aerobic zone, and heterotrophic bacteria and nitrification bacteria utilize part of oxygen provided by oxygen-rich supernatant to oxidize the organic matter and nitrify ammonia nitrogen;

4) making a sludge-water mixture treated in the aerobic zone of the continuous flow bioreactor in step 3) flow through a secondary sedimentation tank to undergo sludge-water separation, such that the supernatant becomes recycled water reaching a standard, and remaining sludge and remaining sludge generated through pretreatment are thickened in a sludge treatment process after being converged; and 5) performing thermal-hydrolysis and anaerobic acidification reactions on thickened sludge obtained through thickening treatment in step 4), and purifying generated carbon dioxide and adding same into the photobioreactor for recycling, wherein acidified sludge may be further processed into a carbon source product or treated into a biogas product.

With certain municipal sewage treatment as an example and sewage pretreated till a primary sedimentation tank in this plant as experimental water, a set of middle scale device for sewage treatment is built whose daily water treatment amount is 100 m³/d, a process is as shown in FIG. 1 and an operation method includes the following steps:

making the sewage pass through a coagulative sedimentation tank, and after coagulating and precipitating suspended solids, adding carbon dioxide and air-compressed sludge into supernatant in a 120-L gas dissolution device to treat carbon dioxide waste gas. Making the mixed liquid enter the 600 m³ photobioreactor, wherein in this example, the photobioreactor uses the flat-plate type photobioreactor which is formed by connecting a plurality of reactors in series. Utilizing microalgae in the photobioreactor to remove phosphorus and part of ammonia nitrogen, wherein a hydraulic retention time of the photobioreactor is 4.8 d, an algal density is $8\times10^6$/mL or so, and natural lighting is used. Arranging an algal liquid reflux port at a tail end of the photobioreactor, and making an algal liquid reflux to a front end of the photobioreactor through a pump, wherein the reflux ratio is 150% of the influent amount. And making a remaining algal liquid flow into a gas flotation apparatus to separate a concentrated algal liquid and supernatant, scraping an upper-layer floating concentrated algal liquid out of an algal liquid tank through a scraper and then pumping the upper-layer floating concentrated algal liquid to the filter press to produce an algal biscuit product. Algae in this example are mixed algae purchased from the market, of which the main component is scenedesmus quadricauda.

The supernatant of the gas flotation apparatus is driven into the continuous flow bioreactor in two parts through two lift pumps, 30% supernatant of the flow enters the anoxic zone of the continuous flow bioreactor after passing through the gas-stripping deaerator to reduce dissolved oxygen to 0.2 mg/L, wherein a retention time in the anoxic zone is 2 h; 70% supernatant of the flow enters the aerobic zone, and the aerobic zone is provided with a standby air spargers and a blower; a retention time in the aerobic zone is 6.5 h, which includes a retention time of 0.5 h in the deoxygenation zone at the tail end, a nitrification liquid flows back to the front end of the anoxic zone from the deoxygenation zone, and the reflux ratio is 150% of the influent flow; and the concentration of sludge of the continuous flow bioreactor is maintained at 3000-4000 mg/L, and a retention time of the sludge is 15 d. The sludge-water mixture treated in the aerobic zone of the continuous flow bioreactor flows through a radial flow type secondary sedimentation tank to undergo sludge-water separation, a hydraulic retention time in the secondary sedimentation tank being 2 h. Part of sediment at the bottom of the secondary sedimentation tank serves as sludge to reflux to the anoxic zone, wherein the reflux ratio is 100% of the influent flow; and a small part of remaining sludge and remaining sludge generated through pretreatment are treated in a sludge treatment process after being converged.

The remaining sludge is thickened and then subjected to thermal-hydrolysis and anaerobic acidification reactions, and generated carbon dioxide and carbon dioxide waste gas after combustion are collected and purified and then air-compressed to be finally added into the gas dissolution device in a gas dissolution mode.

After continuous experiments, data of the system on-way water quality of the present disclosure are as Shown in FIG. 3, in the day time, a nitrogen and phosphorus removal rate of the photobioreactor can be up to 90% or more, a concentration of dissolved oxygen of alga separation apparatus effluent is up to 225.8 mg/L; the blower in the aerobic zone of the continuous flow bioreactor is not required to be turned on, due to the oxygen from alga separation apparatus effluent can be utilized 100%. At night, the nitrogen and phosphorus removal rate of the photobioreactor is reduced to 70%, dissolved oxygen of effluent is also reduced to 1.36 mg/L, and the blower of the continuous flow bioreactor may be turned on at night, so as to guarantee an effluent quality. Experimental results show that the effluent quality of the system of the present disclosure is far better than the primary standard A. As shown in FIG. 4, after 35-day long-term operation, compared with a traditional activated sludge $A^2$/O-based process for sewage treatment under the same influent quality condition, except that remaining water qualities are substantially the same, in terms of TN, the effluent quality of the process of the case of the present disclosure is better than that of the A²/O process, and a concentration of TN of the effluent is stable and less than 5 mg/L. A comparison effect of partial energy consumption costs between the case of the present disclosure and a traditional activated sludge-based system for sewage treatment is as shown in FIG. 4, the system of the case of the present disclosure can save on 60% of energy consumption of the blower, and 100% of addition of a carbon source and a phosphorous removal agent, thereby saving on 68.5% or more of the total unit consumption of the blower and the agent, and meanwhile, a large number of algal biscuit products, algal powder products, etc. are produced.

The above-mentioned descriptions on the embodiments are intended to be conducive to understanding and applying the present disclosure by those of ordinary skill in the art. It is obvious that a person who is familiar with the skill in the art may make various modifications to these embodiments easily and apply the general principle described herein to other embodiments without making inventive efforts. Hence, the present disclosure is not limited to the embodiments herein, and improvements and modifications made by a person skilled in the art in accordance with the disclosure of the present disclosure without departing from the scope of the present disclosure shall all fall within the scope of protection of the present disclosure.

What is claimed is:

1. A bacterium-alga coupled sewage treatment device comprising: a pretreatment device, a photobioreactor, an alga separation apparatus, a continuous flow bioreactor and a secondary sedimentation tank which are sequentially connected in order; the pretreatment device being connected to a municipal sewage inlet pipe; the photobioreactor being connected to a carbon dioxide gas charging device through a gas filling pipeline; one part of a sludge thickening tank being connected to the secondary sedimentation tank, the other part of the sludge thickening tank being connected to the pretreatment device; and the alga separation apparatus being further connected to a filter press.

2. The bacterium-alga coupled sewage treatment device according to claim 1, wherein the pretreatment device is one form of a grating, an ultrafiltration membrane, a flocculation sedimentation tank and a sand filter or any combination thereof.

3. The bacterium-alga coupled sewage treatment device according to claim 2, wherein the photobioreactor is a flat-plate type photobioreactor, an up-flow type photobioreactor, a pipeline type photobioreactor or a closed type annular shallow tank.

4. The bacterium-alga coupled sewage treatment device according to claim 3, wherein the photobioreactor is provide with microalgae, and the microalgae in the photobioreactor is spirulina, scenedesmus or nannochloropsis.

5. The bacterium-alga coupled sewage treatment device according to claim 4, wherein the photobioreactor comprises an automatic control system and the carbon dioxide gas charging device, the automatic control system comprising a PLC control system and carbon dioxide online monitor assemblies, the gas filling pipeline of the carbon dioxide gas charging device being provided with a valve, and the carbon dioxide online monitor assemblies being arranged in a bacterium liquid of the photobioreactor, and on the gas filling pipeline respectively, and configured to detect concentrations of carbon dioxide in real time online and transmit the concentrations of the carbon dioxide detected in real time to the PLC controller.

6. The bacterium-alga coupled sewage treatment device according to claim 1, wherein the continuous flow bioreactor is provided with an aeration system and an accurate aeration monitoring control system, the aeration system comprising air spargers, blowers, valves and flow meters; the air spargers being arranged at the tank bottom of the aerobic zone, the blowers being connected to the air spargers through air pipes, the valves and the flow meters being arranged on the air pipes respectively; the accurate aeration monitoring control system comprising dissolved oxygen meters, an ammonia nitrogen meter and an accurate control system, one dissolved oxygen meter being arranged in the supernatant of the alga separation apparatus, one dissolved oxygen meter being arranged in the aerobic zone, the ammonia nitrogen meter being arranged at the tail end of the aerobic zone, the accurate control system being in data signal connection with the dissolved oxygen meters and the ammonia nitrogen meter respectively; the accurate control system being in control connection with the valves; and the accurate aeration monitoring control system automatically controlling the blowers and opening of the valves according to acquired changing signals of concentrations of dissolved oxygen and ammonia nitrogen and maintaining dissolved oxygen in the aerobic zone at 1-2 mg/L and a concentration of ammonia nitrogen at the tail end of an aeration tank less than 0.1 mg/L.

7. A method for bacterium-alga coupled sewage treatment which utilizes the bacterium coupled sewage treatment device of claim 6, the method comprising the following steps:

1) making the municipal sewage enter the photobioreactor after suspended matter and toxic matter are removed by the pretreatment device, adding carbon dioxide and recycled sludge anaerobic acidificated carbon dioxide, and using microalgae in the photobioreactor to remove phosphorus and ammonia nitrogen, the recycled sludge anaerobic acidificated carbon dioxide being obtained from the sludge in the sludge thickening tank through thermal hydrolysis and anaerobic acidification treatment;

2) separating, in the alga separation apparatus, a concentrated algal liquid and supernatant from an alga-containing mixed liquid treated by the photobioreactor in step 1), making the concentrated algal liquid into an algal biscuit through filter-press operation of the filter press;

3) making the supernatant in step 2) enter the continuous flow bioreactor in two parts, wherein one part of the supernatant enters the anoxic zone of the continuous flow bioreactor after deoxygenation, denitrification bacteria utilize organic matter to perform denitrification, so as to remove nitrate nitrogen in reflux sludge and a nitrification liquid, the other part of the supernatant enters the aerobic zone, and heterotrophic bacteria and nitrification bacteria utilize part of oxygen provided by oxygen-rich supernatant to oxidize the organic matter and nitrify ammonia nitrogen;

4) making a sludge-water mixture treated in the aerobic zone of the continuous flow bioreactor in step 3) flow through the secondary sedimentation tank to undergo sludge-water separation, such that the supernatant becomes recycled water, and remaining sludge and remaining sludge generated through pretreatment are thickened in the sludge thickening tank after being converged; and 5) performing thermal-hydrolysis and anaerobic acidification reactions on thickened sludge obtained through thickening treatment in step 4), and purifying generated carbon dioxide and adding same into the photobioreactor for recycling, wherein acidified sludge may be further processed into a carbon source product or treated into a biogas product.

\* \* \* \* \*